3,070,610
Patented Dec. 25, 1962

3,070,610
ANTHRAQUINONE DYESTUFFS CONTAINING A REACTIVE ALIPHATIC CARBOXYLIC ACID GROUP
Arthur Buehler, Rheinfelden, Switzerland, assignor to Ciba Company, Inc., Fair Lawn, N.J.
No Drawing. Filed Mar. 26, 1959, Ser. No. 802,002
Claims priority, application Switzerland Mar. 28, 1958
6 Claims. (Cl. 260—372)

This invention provides water-soluble anthraquinone dyestuffs of the formula

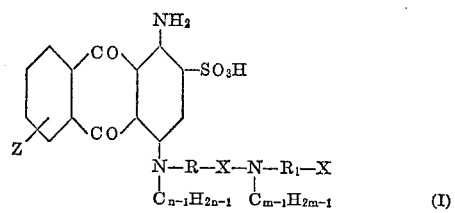

(I)

in which Z represents a sulfonic acid group or a hydrogen atom, $n$ and $m$ each represent a whole number, R represents a benzene radical, $R_1$ represents a benzene radical or an alkylene bridge, X represents a —CO— or —$SO_2$— group, and Y represents an amino group containing a reactive substituent.

As reactive substituents there may be mentioned, for example, $\alpha{:}\beta$-unsaturated acyl groups of aliphatic carboxylic acids, such as the acryl radical, the $\alpha$-chloracryl group and the group of the formula

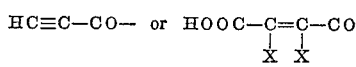

(in which one of the two X′ is a hydrogen atom and the other X a chlorine atom) and advantageously radicals containing labile halogen atoms. In such radicals the labile halogen atom, that is to say, one capable of reacting with fibrous materials, may be bound to a heterocyclic radical containing two nitrogen atoms, for example, to a pyramidine radical or to the acyl group of an acid containing at least one acid group of the constitution

for example an acyl group derived from barbituric acid, cyanuric acid or an aliphatic carboxylic acid. When the acyl group is that of cyanuric acid, the dyestuff contains at least one halogen atom bound to a 1:3:5-triazine ring, for example, a dichlorotriazine radical or a monochlorotriazine radical, such as the radical of the formula

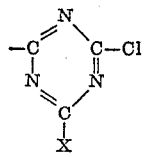

in which X represents an amino group which may be substituted or a substituted hydroxyl group. The acyl groups containing halogen and derived from aliphatic carboxylic acids advantageously contain only a few carbon atoms, for example, 2–3 carbon atoms. As examples there may be mentioned the chloracetyl radical, the $\alpha$- or $\beta$-chloropropionyl radical and above all the $\alpha$-$\beta$-dichloropropionyl radical.

The invention also provides a process for the manufacture of the dyestuffs of the above Formula 1, wherein an anthraquinone dyestuff of the formula

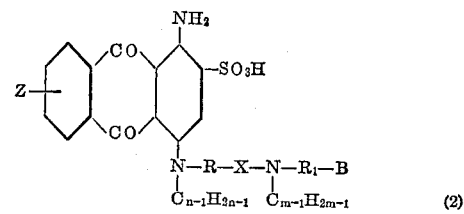

(2)

in which Z, R, X, $R_1$, $n$ and $m$ have the meanings given above, and B represents an acylatable amino group, advantageously a free amino group, is reacted with an anhydride or halide of an acid of which the acyl group is capable of entering into chemical combination with the fibrous material, so that the acylatable amino group B is acylated.

As anhydrides or halides of acids of which the acyl group is reactive there may be mentioned, for example, the anhydrides and halides of aliphatic $\alpha{:}\beta$-unsaturated carboxylic acids, for example, chloromaleic anhydride, propiolic acid chloride, acrylic acid chloride and especially the halides of aliphatic carboxylic acids containing labile halogen atoms, such as chloracetyl chloride, sulfochloracetic chloride, $\beta$-bromo- or $\beta$-chloro-propionic acid chloride, $\alpha$-$\beta$-dichloropropionic acid chloride, and also tri-chloropyrimidine and preferably cyanuric chloride or a primary condensation product of cyanuric chloride which contains two chlorine atoms and, instead of the third chlorine atom, a free amino group or an organic radical. Such primary condensation products can be obtained by methods in themselves known from one molecular proportion of cyanuric chloride and one molecular proportion of a reactive organic hydroxyl-compound (for example, one molecular proportion of a phenol or alcohol), and one molecular proportion of ammonia or of an organic amine, such as methyl-amine, isopropylamine, cyclohexylamine or phenylamine, dimethyl-amine, N-ethylphenylamine, $\gamma$-methoxy-propylamine, phenyl-hydrazine sulfonic acids, aminoethane sulfonic acid, amino-acetic acid, ortho-, meta- or para-aminobenzoic acid, amino-benzene sulfonic acid, such as ortho-, meta- or para-amino-benzene sulfonic acid and 1-aminobenzene-2:5-disulfonic acid, aminophthalene sulfonic acids, and also mercapto-acetic acid or the like.

The starting materials of the Formula 2 can be prepared by the usual methods, for example, by condensing an aminoanthraquinone of the formula

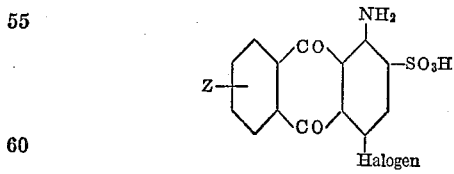

in which the symbol Z has the meaning given in connection with Formula 1, with an aminobenzene sulfonic acide amide or carboxylic acid amide of which the amide radical contains an acylatable amino group or an acylated amino group of which the acyl group may, be split off by hydrolysis, if desired, after the condensation.

As aminobenzene sulfonic acid amides and carboxylic acid amides which are to be condensed with the 4-halogen-, especially 4-bromo-1-aminoanthraquinone-2:5- or -2:6- or -2:7- or -2:8-disulfonic acid, or more especially with the 4-bromo-1-aminoanthraquinone-2-sulfonic acid, there may be mentioned: 1-aminobenzene-3- or -4-carboxylic acid-N-(4'-aminophenyl)-amide-3'-sulfonic acid, 1-aminobenzene-3- or -4-sulfonic acid-N-(5'-amino-2'-methylphenyl)-amide-4'-sulfonic acid, 1-aminobenzene-3- or -4-carboxylic acid-N-(3'-aminophenyl)-amide-4'-sulfonic acid, 1-aminobenzene-3- or -4-sulfonic acid-N-(3'-aminophenyl)-amide-4'-sulfonic acid, 1-aminobenzene-3- or -4-sulfonic acid-N-(4'-aminophenyl)-amide-3'-sulfonic acid, 4-methyl- or 4-chloro-1-aminobenzene - 3 - sulfonic acid-N-(3'-aminophenyl)-amide-4'-sulfonic acid, and also 1-aminobenzene-3-sulfonic acid-N-(5'- or -4'-acetylaminophenyl)-amide-2'-sulfonic acid, 1-aminobenzene-3- or -4-sulfonic acid-N-(3'-acetaminophenyl)-amide - 4' - sulfonic acid, 1-aminobenzene-3- or -4-sulfonic acid-N-(β-acetaminoethyl)-amide, the corresponding acetylamino-hexylamide and 1-aminobenzene-3- or -4-sulfonic acid-N-(3'-acetaminophenyl)-amide, of which the acetyl amino group is hydrolysed after the condensation with a 4-halogen-1-aminoanthraquinone.

The condensation or acylation of the dyestuffs of the Formula 2 obtainable from the above compounds is advantageously carried out in the presence of an acid-binding agent, such as sodium acetate, sodium hydroxide or sodium carbonate, and under conditions such that the resulting product contains a reactive substituent, more especially a reactive halogen atom. Thus, the acylation may be carried out, for example, in an organic solvent or at a relatively low temperature in an aqueous medium. When cyanuric chloride is used as acylating agent the dyestuff formed by the primary condensation and having the formula

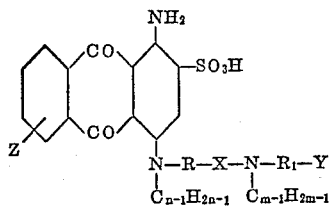

in which Z, R, X, $R_1$, $m$ and $n$ have the meanings given in connection with Formula 1, and Y represents a 2:4-dichloro-1:3:5-triazine ring bound in the 6-position through an amino bridge to $R_1$, is reacted with ammonia, an alcohol or a phenol or more especially with an organic monamine to form a secondary condensation product, the reaction being advantageously carried out at a somewhat raised temperature, for example, within the range of 30° C. to 90° C., and advantageously 40° C. to 60° C., whereby the condensation proceeds more rapidly and completely than at lower temperatures, and it is surprising that the third chlorine atom of the cyanuric chloride is not attacked.

The dyestuffs of the Formula 1 are new. They are valuable dyestuffs for dyeing or printing a very wide variety of materials, especially nitrogenous fibers such as wool, superpolyamides, leather, silk, and also polyhydroxylated materials of fibrous structure, such as cellulosic materials including synthetic fibers, for example of regenerated cellulose, and natural materials, for example, linen, cellulose or above all cotton. They are suitable for dyeing polyhydroxylated fibrous materials by the so-called direct dyeing methods and also by the pad-dyeing method, especially from an alkaline aqueous solution, which may contain a high concentration of salt, for example, by the process in which the dyestuff is fixed on the material by means of an acid-binding agent at a raised temperature. The dyeing of nitrogenous fibers, such as wool, is advantageously carried out from an acid to neutral bath, if desired, in the presence of a compound containing at least one basic nitrogen atom, to which is bound at least one radical containing a polyglycol ether chain, the molecule containing at least four

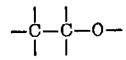

groups (advantageously —CH$_2$—CH$_2$—O— groups) and at least four carbon atoms not forming part of such groups, for example, in the presence of a nitrogen compound of the formula

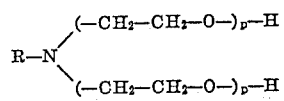

in which R represents an, advantageously unbranched, aliphatic hydrocarbon radical containing at least 12, and preferably 16-20, carbon atoms, and $p$ and $q$ each represent a whole number and the sum of $p+q$ is at least 4 and preferably 6-16.

The dyeings and prints produced with the dyestuffs of the Formula 1 are in general distinguished by the brilliance and the purity of their reddish blue tints, by their good fastness to chlorine and light and above all by their excellent fastness to washing.

The following examples illustrate the invention, the parts being by weight:

Example 1

38.2 parts of 1-amino-4-bromanthraquinone-2-sulfonic acid and 44.0 parts of 4-aminotoluene-2-sulfonic acid-N-(3'-acetyl-aminophenyl)-amide-4'-sulfonic acid are pasted in 400 parts of water and mixed with 60 parts of sodium bicarbonate. 1 part of cuprous chloride is added and the mixture is heated to and stirred at 80 to 90° C. until bromamino-anthraquinone-sulfonic acid can no longer be detected. The blue dyestuff of the formula

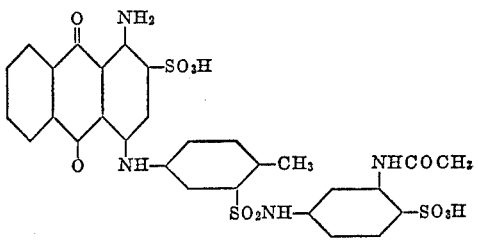

is separated by acidification and salting out, filtered off and, if desired, washed with sodium chloride solution.

To hydrolyse the acetyl group and liberate the amino group, the resulting dyestuff paste is stirred in 200 parts of water, heated to 80° C. and refluxed for several hours with 400 parts of a sulfuric acid solution of α-naphthalene-sulfonic acid containing 30% by weight of α-naphthalene-sulfonic acid. On cooling, the hydrolysed dyestuff precipitates in crystalline form.

100 parts of ice are added to a solution of 19 parts of cyanuric chloride in 80 parts of acetone. The resulting suspension of cyanuric chloride is run into a neutralised solution, cooled to +2° C., of 65.8 parts of the dyestuff of the formula

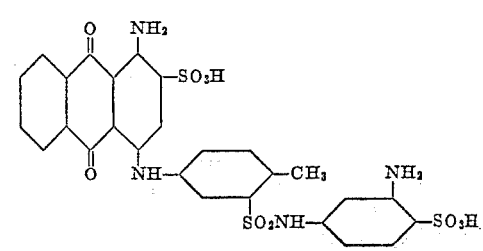

in 1500 parts of water. By gradual addition of 50 parts by volume of 2 N-sodium hydroxide solution the reaction mixture is maintained constant at pH=6 to 7. After stirring for about 2 hours the condensation is complete. A solution of 17.3 parts of 1-aminobenzene-3-sulfonic acid in 500 parts of water is added, and the reaction mixture is slowly raised to a temperature of 30 to 50° C., and the liberated acid is again continually neutralised with a total of 50 parts by volume of 2 N-sodium hydroxide solution. On completion of the reaction the resulting dyestuff is salted out with sodium chloride, filtered off and dried; it forms a blue powder which dissolves in water with blue coloration and in concentrated sulfuric acid with green-blue coloration and dyes cotton and regenerated cellulose by the process described in Example 6 full, reddish blue tints of good fastness to washing and light.

Prior to the condensation with 1-aminobenzene-3-sulfonic acid, the corresponding dichloro-dyestuff can be isolated in powder form by addition of salt, filtration and drying; it dyes wool and cotton blue tints.

When wool is dyed with this dyestuff from a weakly acetic acid bath, valuable blue tints of good fastness properties are likewise obtained.

The 4-amino-1-methylbenzene-2-sulfonic acid-N-(3'-acetyl-aminophenyl)-amide-4'-sulfonic acid used in this example can be prepared, for example, as follows:

23.5 parts of para-nitrotoluene-ortho-sulfonyl chloride and 19.0 parts of 2:4-diaminobenzenesulfonic acid are pasted in 500 parts of water and at a slightly raised temperature the reaction mixture is kept weakly alkaline by addition of 10 parts of sodium hydroxide solution of 30% strength. On completion of the condensation the sulfonamide formed is quantitatively precipitated by acidification with hydrochloric acid, filtered off and, if desired, washed.

The crude crystalline mass is then dissolved in 100 parts of water by adding 10 parts of sodium hydroxide solution of 30% strength. 50 parts of acetanhydride are added, whereupon acetylation sets in spontaneously with evolution of heat, and the acetyl derivative precipitates in magnificent crystals.

The reduction of the nitro group is carried out in the conventional manner by Béchamp's method with iron and hydrochloric acid. When the reduction mixture is alkalinised, purified by filtration, acidified and treated with sodium chloride, the 4-amino-1-methylbenzene-2-sulfonic acid-N-(3'-acetylaminophenyl)-amide-4'-sulfonic acid is obtained in crystalline form.

When the 2:4-diaminobenzene sulfonic acid is replaced by 23 parts of 4-acetylamino-2-aminobenzenesulfonic acid, proceeding otherwise in identical manner, 4-amino-1 - methyl - benzene - 2 - sulfonic acid - N - (5' - acyl-aminophenyl)-amide-2'-sulfonic acid is obtained.

The compounds of the formula

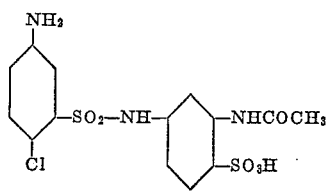

and

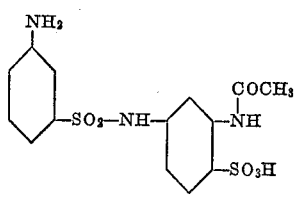

can likewise be prepared in analogous manner by using instead of para-nitrotoluene-ortho-sulfonyl chloride corresponding proportions of 5-nitro-2-chlorophenyl-1-sulfonyl chloride or of meta-nitrobenzenesulfonyl chloride.

*Example 2*

When in Example 1, paragraphs 1 to 3, instead of 4-amino-1-methylbenzene-2-sulfonic acid - N - (3' - acetyl-aminophenyl)-amide-4'-sulfonic acid, 40 parts of 4-amino-1-methylbenzene-2-sulfonic acid-N-(3' - aminophenyl)-amide-4'-sulfonic acid are condensed with 38.2 parts of 1-amino-4-bromanthraquinone-2-sulfonic acid to 60 to 70° C. instead of at 80–90° C., and the reaction mixture is further worked up, a dyestuff is obtained which has identical properties.

*Example 3*

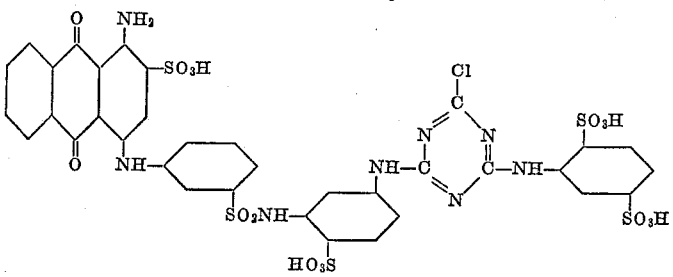

100 parts of ice are added to a solution of 19 parts of cyanuric chloride in 80 parts of acetone. The resulting suspension of cyanuric chloride is mixed with a solution, cooled to 0° C., of 32.7 parts of the disodium salt of 1-aminobenzene-2:5-disulfonic acid in 330 parts of water. In the course of 2 hours 55 parts by volume of 2 N-sodium carbonate solution are added dropwise, while maintaining the temperature at 2 to 4° C. by external cooling. A clear solution is obtained of the condensation product from equimolecular proportions of cyanuric chloride and 1-aminobenzene-2:5-disulfonic acid which, if desired, can then be purified by being filtered.

The resulting solution is added to an aqueous neutral solution, heated at 40° C., of 64.3 parts of the dyestuff of the formula

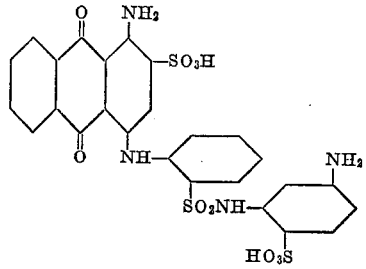

in 1500 parts of water, and the pH value of the reaction mixture is maintained constant at pH=6 to 7 by the gradual addition of 50 parts by volume of 2 N-sodium hydroxide solution. On completion of the condensation the dyestuff is salted out with sodium chloride, filtered off and dried in a vacuum cabinet at 70 to 80° C. It forms a blue powder which dissolves in water with blue coloration and dyes cotton by the method described in Example 6 reddish blue tints which are fast to washing and light.

By the method described above further dyestuffs which dye reddish blue tints are obtained by condensing cyanuric chloride or cyanuric bromide with the anthraquinone dyestuffs shown in Column I of the following table and with the compounds in Column II

| | I | II |
|---|---|---|
| 1 | anthraquinone-NH-C₆H₄-SO₂NH-C₆H₃(NH₂)(SO₃H) with NH₂, SO₃H on aminoanthraquinone | 1-aminobenzene-3-sulfonic acid. |
| 2 | anthraquinone-NH-C₆H₄-SO₂NH-C₆H₃(NH₂)(SO₃H) | 1-aminobenzene-2:5-disulfonic acid. |
| 3 | anthraquinone-NH-C₆H₄-SO₂NH-C₆H₃(NH₂)(SO₃H) | 1-aminobenzene-2-sulfonic acid. |
| 4 | anthraquinone-NH-C₆H₄-CO-NH-C₆H₃(NH₂)(SO₃H) | Do. |
| 5 | anthraquinone-NH-C₆H₃(SO₃H)-SO₂-NH-C₆H₃(NH₂)(SO₃H) | 1-aminobenzene-2:5-disulfonic acid. |
| 6 | anthraquinone-NH-C₆H₃(SO₃H)-SO₂-NH-C₆H₃(NH₂)(SO₃H) | 1-aminobenzene-2-carboxylic acid-5-sulfonic acid. |
| 7 | anthraquinone-NH-C₆H₃(SO₃H)-SO₂-NH-C₆H₃(NH₂)(SO₃H) | 1-aminobenzene-2-carboxylic acid-4-sulfonic acid. |

| | I | II |
|---|---|---|
| 8 | (structure: anthraquinone with NH₂, SO₃H, and NH–C₆H₄–SO₂–NH–C₆H₄–NH₂ with HO₃S substituent) | ammonia. |
| 9 | (structure: anthraquinone with NH₂, SO₃H, and NH–C₆H₄–SO₂NH–C₆H₄–NH₂ with HO₃S substituent) | methanol. |
| 10 | (structure: anthraquinone with NH₂, SO₃H, and NH–C₆H₄–SO₂NH–C₆H₄–NH₂ with HO₃S substituent) | 2-aminopropanol. |
| 11 | (structure: anthraquinone with NH₂, SO₃H, and NH–C₆H₄–SO₂NH–C₆H₄–NH₂ with HO₃S substituent) | mercaptoacetic acid. |
| 12 | (structure: anthraquinone with NH₂, SO₃H, and NH–C₆H₄–SO₂NH–C₆H₄–NH₂ with HO₃S substituent) | γ-methoxypropylamine. |
| 13 | (structure: anthraquinone with NH₂, SO₃H, and NH–C₆H₄(Cl)–SO₂NH–C₆H₄(SO₃H)–NH₂) | 1-aminobenzene-2:5-disulfonic acid. |
| 15 | (structure: anthraquinone with NH₂, SO₃H, and NH–C₆H₄(CH₃)–SO₂NH–C₆H₄(SO₃H)–NH₂) | 1-aminobenzene-3-sulfonic acid. |

*Example 4*

3-aminobenzenesulfonic acid-N-(β-acetamino-ethyl)-amide is prepared by acylating monoacetyl-ethylenediamine with 3-nitrobenzenesulfonyl chloride and reducing the nitro group in the resulting diacyl derivative to an NH₂-group.

30.8 parts of this product are condensed with 38.2 parts of 1-amino-4-bromanthraquinone-2-sulfonic acid and 30 parts of sodium bicarbonate in the presence of cuprous chloride in an aqueous medium, and after filtration the isolated dyestuff paste is refluxed at the boil for a prolonged period with 250 parts of a sulfuric acid solution of about 15% strength of α-naphthalenesulfonic acid for the purpose of the hydrolysis of the acetylamino group. Filtration of the reaction mixture yields the dyestuff of the formula Example 6 reddish blue tints which are fast to washing and light.

Further dyestuffs which produce similar tints are obtained by this method when the anthraquinone dyestuffs shown in Column I of the following table are condensed in an analogous manner with the compounds in Column II.

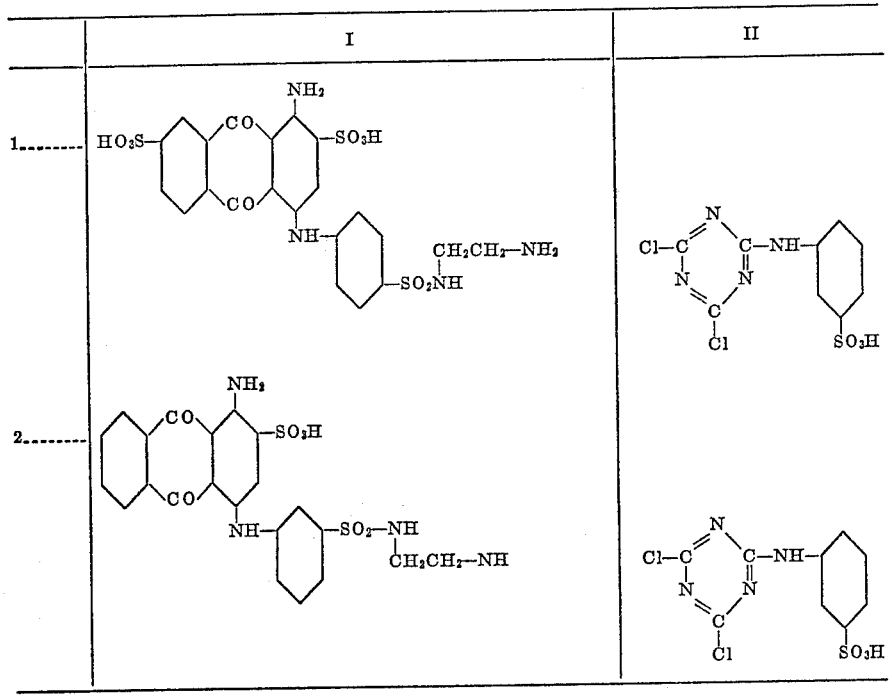

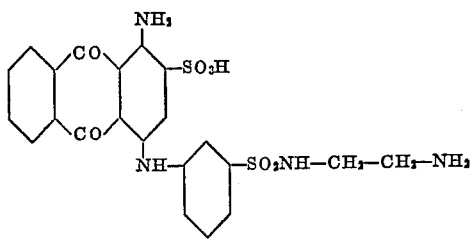

or its sulfate respectively.

51.6 parts of this dyestuff in 1500 parts of water are neutralised with sodium hydroxide. The neutral solution is treated with an aqueous solution (prepared from 19 parts of cyanuric chloride and 32.7 parts of the disodium salt of 1-aminobenzene-2:5-disulfonic acid) of the primary condensation product which, in the form of the free acid, corresponds to the formula

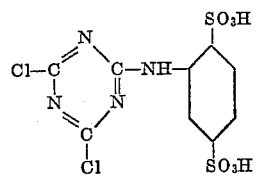

The pH value of the reaction mixture is kept constant at 6 to 7 by gradually adding a 2 N-aqueous solution of sodium hydroxide. On completion of the condensation the dyestuff is salted out with sodium chloride, filtered off and dried in a vacuum cabinet at 70 to 80° C. It forms a blue powder which dissolves in water with blue coloration and dyes cotton by the method described in

*Example 5*

13.16 parts of the dyestuff of the formula

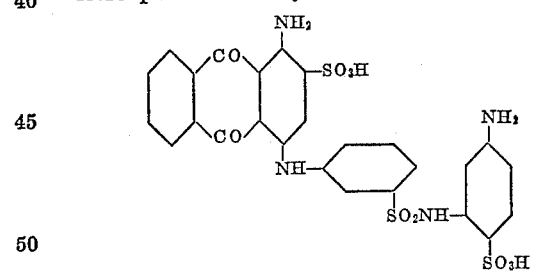

in 1500 parts of water are neutralised with sodium hydroxide and 13 parts of anhydrous sodium acetate are added. While stirring vigorously, 7.23 parts of acrylic acid chloride in 50 parts of acetone are added dropwise at 0–5° C. in the course of 15 minutes. After ½ hour the solution is adjusted with sodium carbonate to pH=9, and the dyestuff is salted out with 200 parts of potassium chloride and filtered off. The dyestuff dyes wool and cotton reddish blue tints.

Similar dyestuffs are obtained when the acrylic acid chloride is replaced by 10 parts of α-chloracrylic acid chloride or β-chloropropionic acid chloride and the liberated hydrochloric acid is neutralised with sodium carbonate or sodium bicarbonate.

When 13.16 parts of the dyestuff of the formula

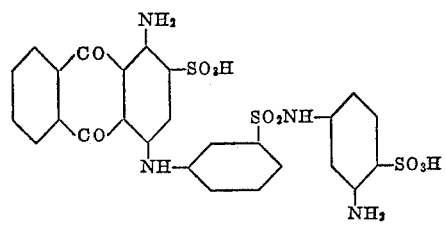

are used and the acylation is performed as described above with chloracetyl chloride or with α:β-dichloropropionic acid chloride, the resulting dyestuff likewise gives reddish blue tints.

A similar dyestuff is obtained by this method from β-chloro-propionyl chloride and the 1-amino-4-phenylamino anthraquinone-3'-sulfonic acid-N-(β-aminoethyl)-amide-2-sulfonic acid mentioned in Example 4.

*Example 6*

1 part of the dyestuff obtained as described in Example 3 is dissolved in 100 parts of water. A fabric of regenerated cellulose staple fiber is impregnated with the resulting solution until the fabric shows an increase in weight of 75% and then dried. The fabric is then impregnated with a solution of 20° C. containing per liter 10 grams of sodium hydroxide and 300 grams of sodium chloride, squeezed to a weight increase of 75%, the dyeing is steamed for 60 seconds at 100 to 101° C., rinsed, treated in a sodium bicarbonate solution of 0.5% strength, rinsed, soaped for 15 minutes in a boiling solution of a non-ionic detergent of 0.3% strength, rinsed and dried. A reddish blue dyeing results.

*Example 7*

A dyebath is prepared from 4000 parts of water, 5 parts of acetic acid of 40% strength, 10 parts of crystalline sodium sulfate, 1 part of the addition product described below of octadecenylamine and ethylene oxide and 2 parts of the dyestuff of the formula

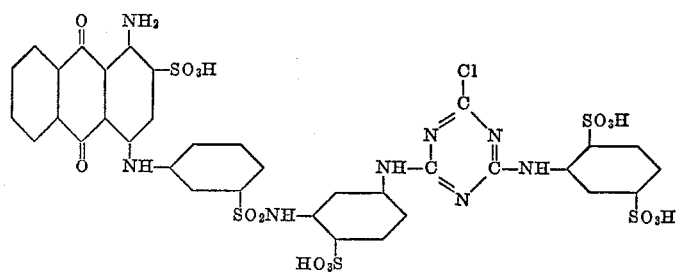

At 60° C., 100 parts of woolen piece goods are immersed in this dyebath which is then raised to the boil within half an hour, and dyeing at the boil is performed for 1 hour. The wool is then withdrawn from the dyebath—if desired, after addition of 0.8 part of an aqueous ammonia solution of 25% strength—immediately rinsed in water and dried. A level reddish blue dyeing is obtained which has good fastness to light and wetting.

The ethylene oxide addition product is prepared in the following manner:

100 parts of commercial octadecenylamine are mixed with 1 part of finely disintegrated sodium, the whole is heated to 140° C. and ethylene oxide is introduced at 135 to 140° C. When the ethylene oxide is being consumed rapidly, the reaction temperature is lowered to 120–125° C., and the introduction of ethylene oxide is continued until 113 parts thereof have been absorbed. The resulting reaction product gives an almost clear solution in water.

*Example 8*

1 part of the monochloro-triazine dyestuff obtained as described in Example 1 is dissolved in 50 parts of water and stirred into 1175 parts of a viscose xanthate solution of 8.5% strength, corresponding to a content of 100 parts of α-cellulose. The mass is stirred for ½ hour and then stored for 60 hours at room temperature.

The viscose mass is then spun through spinnerets, in the manner conventionally employed for the manufacture of viscose rayon yarn, and coagulated at 45° C. in a precipitation bath containing per liter 120 grams of sulfonic acid of 96% strength, 270 grams of sodium sulfate and 10 grams of zinc sulfate.

The resulting filaments are stretched by 25% and collected in a spinning can rotating at 6000 revolutions per minute.

The cake obtained in this manner is after-treated in a closed apparatus with circulating liquor; it is first rinsed for 10 minutes with water heated at 60 to 70° C., then desulfurised for 20 minutes at 70° C., with a solution containing per liter 5 grams of sodium sulfite, then again rinsed, and finally brightened for 10 minutes at 50° C. with a solution of 50 grams of sodium oleate per liter. The cake is then freed from its water content and dried. A blue dyeing is obtained which is fast to washing.

What is claimed is:

1. A water-soluble anthraquinone dyestuff of the formula

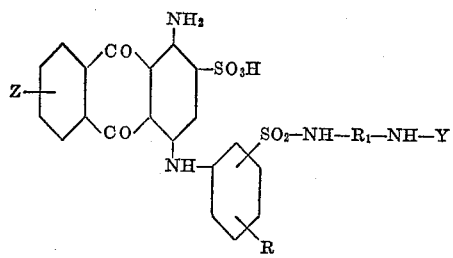

in which Y represents the acyl radical of an acid selected from the group consisting of acrylic acid, α-chloroacrylic acid, chloracetic acid, β-chloropropionic acid, and α,β-dichloropropionic acid, Z is selected from the group consisting of —SO₃H and hydrogen, R is selected from the group consisting of hydrogen and lower alkyl, and R₁ is a divalent radical selected from the class consisting of benzene radical and ethylene radical.

2. The water-soluble anthraquinone dyestuff of the formula

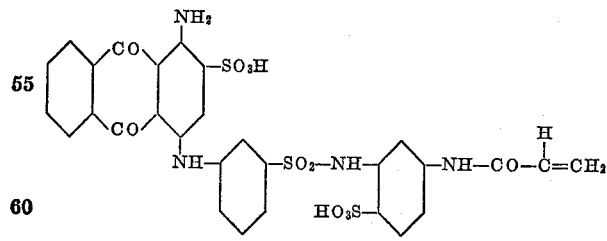

3. The anthraquinone dyestuff of the formula

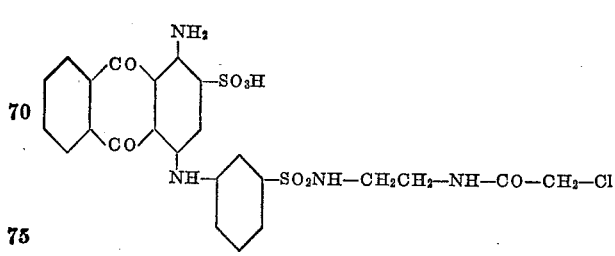

4. The anthraquinone dyestuff of the formula
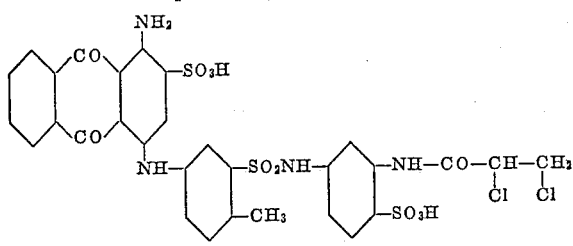
5. The water-soluble anthraquinone dyestuff of the formula
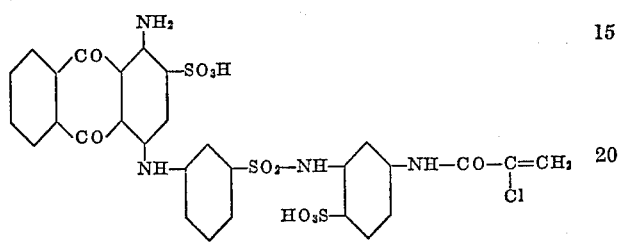
6. The water-soluble anthraquinone dyestuff of the formula
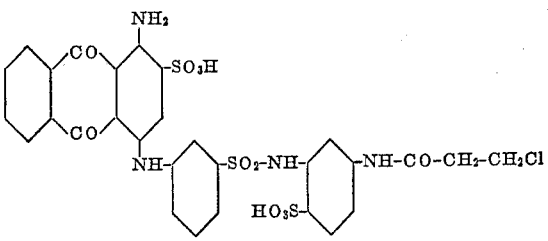
References Cited in the file of this patent
UNITED STATES PATENTS
| | | |
|---|---|---|
| 2,453,104 | Vogt | Nov. 2, 1948 |
| 2,659,736 | Von Allmen et al. | Nov. 17, 1953 |
| 2,670,356 | Weinand | Feb. 23, 1954 |
FOREIGN PATENTS
| | | |
|---|---|---|
| 534,107 | Belgium | June 14, 1955 |